United States Patent [19]
Olson et al.

[11] Patent Number: 4,577,089
[45] Date of Patent: Mar. 18, 1986

[54] AUTOMATIC WELDING MACHINE

[76] Inventors: Gene R. Olson, 985 N. 115th St., Wauwatosa, Wis. 53226; Gregg R. Sorenson, 605 Elm Grove Rd., Elm Grove, Wis. 53122

[21] Appl. No.: 592,728

[22] Filed: Mar. 22, 1984

Related U.S. Application Data

[63] Continuation of Ser. No. 306,469, Sep. 28, 1981, abandoned.

[51] Int. Cl.⁴ ............................................. B23K 9/225
[52] U.S. Cl. ............................... 219/124.22; 219/136; 219/159; 228/48
[58] Field of Search ................. 219/159, 158, 124.22, 219/136; 228/48; 269/8; 335/306

[56] References Cited

U.S. PATENT DOCUMENTS

| | | | |
|---|---|---|---|
| 1,648,683 | 11/1927 | Herald | 219/137 R |
| 1,782,461 | 11/1930 | Chapman | 219/159 |
| 3,658,232 | 4/1972 | Dill | 219/124.22 |
| 3,742,852 | 7/1973 | Leffler et al. | 335/306 |

FOREIGN PATENT DOCUMENTS 126646  10/1979  Japan ...................................... 228/48

*Primary Examiner*—Roy N. Envall, Jr.
*Assistant Examiner*—Alfred S. Keve

[57] ABSTRACT

The automatic welding machine has a pair of closely spaced magnetic rollers which grip the surface of a workpiece and which are driven to rotate the workpiece. The workpiece may rest on a support on the end of a double articulated arm. The driven rollers are adjustably mounted on a standard. The standard also mounts a carriage including a welding gun. The carriage is movable toward and away from the workpiece under the urgings of a probe which is mounted on the carriage with the gun and which travels over the surface of the workpiece as it rotates.

5 Claims, 11 Drawing Figures

AUTOMATIC WELDING MACHINE

This application is a continuation of application Ser. No. 306,469 filed Sept. 28, 1981, now abandoned.

This invention relates to workpiece positioning and particularly to a machine capable of welding seams on varied cross section, irregularly shaped parts while accommodating variations in workpieces such as dents or other irregularities in the workpiece contour.

Many workpieces require the welding of a seam at the junction of a flat plate and a cylinder or a rectangular tube. An example is a circular cylindrical drum which has a flat end plate welded to the cylindrical body. Automatic equipment has been developed in the past to produce the welded seam.

One approach taken by such equipment is to hold the circular cylindrical workpiece stationary while mounting the welding gun or torch on the workpiece and moving the welding gun or torch about the perimeter of the workpiece (see for example U.S. Pat. No. 3,840,170, issued Oct. 8, 1974 to Arikawa et al). A second approach holds the welding gun in a stationary position and instead rotates the circular cylindrical workpiece (see as examples U.S. Pat. Nos. 1,238,257, issued Aug. 28, 1917 to Butler and 1,499,449, issued July 1, 1924 to Bienenstak).

Variations of these two general approaches in automatic welding machines include the arrangement shown in U.S. Pat. No. 1,782,461, issued Nov. 25, 1930 to Chapman, in which a pair of widely-spaced rolls, which may be magnetized, engage the outer periphery of a workpiece which is mounted on a table supported on casters. A vertically depending welding gun is guided along the seam to be welded by a guide roll which travels the periphery of the workpiece as the workpiece is rotated by the rolls. In U.S. Pat. No. 3,658,232, issued Apr. 25, 1972 to Dill, a vertically oriented welding gun is guided along a seam by guide rollers which traverse the curved sides of the workpiece. In that patent, the workpiece is rotated by a drive wheel which engages the top of the flat plate which is being welded to the curved sides of the workpiece.

The foregoing equipment works well for circular cylindrical workpieces or those which include only very gently curved surfaces. Some of this equipment, however, is not usable at all on workpieces which do not have a circular cross section. While other of the equipment, such as that in U.S. Pat. No. 1,782,461, could accommodate non-circular cylindrical workpieces, it would not function to maintain the proper attitude of the welding gun relative to the workpiece. As a result, it would not develop a smooth, even weld along a seam.

We have developed automatic equipment which will provide a smooth, continuous, even weld of the seam of cylindrical and other workpieces which have non-circular and irregular cross sections while accommodating part to part variation. Although the equipment is particularly useful in automatic welding, it can also be used to position parts for flame cutting, laser cutting, glue gun joining or wooden or plastic parts, or for any other process requiring positioning relative to a tool.

SUMMARY OF THE INVENTION

In accordance with the invention we provide positioning apparatus which includes a pair of closelyspaced magnetic rollers which are adapted to engage a workpiece and which are driven to turn the workpiece, together with a welding gun or other tool mounted so that its tip is positioned near a plane midway between the rollers.

Further in accordance with the invention, we provide an automatic welding machine which includes a workpiece support plate which is freely movable in a horizontal plane, a pair of closely-spaced driven magnetic rollers which engage the perimeter of a workpiece positioned on the support plate to rotate the workpiece, and a welding gun held in a carriage assembly which is movable toward and away from the midpoint between the rollers.

Further in accordance with the invention, such an automatic welding machine is provided in which the driven rollers are mounted on an upright standard with their axes normal to the plane of the support table, and the welding gun is also mounted on the standard and is movable in a direction normal to the axes of the rollers, together with a probe mounted with the welding gun and which engages the surface of the workpiece to position the welding gun relative to the workpiece.

It is one principal object of this invention to provide a positioning and turning a workpiece relative to a tool, such as a welding gun or the like.

It is another principal object of this invention to provide an automatic welding machine which can weld seams on irregularly shaped objects, including welding around sharp corners, and which will accommodate part-to-part variations.

It is a further object of the invention to provide such an automatic welding machine which can weld along straight or curved paths.

It is still a further object of the invention to provide an automatic welding machine in which a workpiece is gripped by two rollers which include permanent magnets and in which the rollers are driven in the same direction to thereby turn the workpiece.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
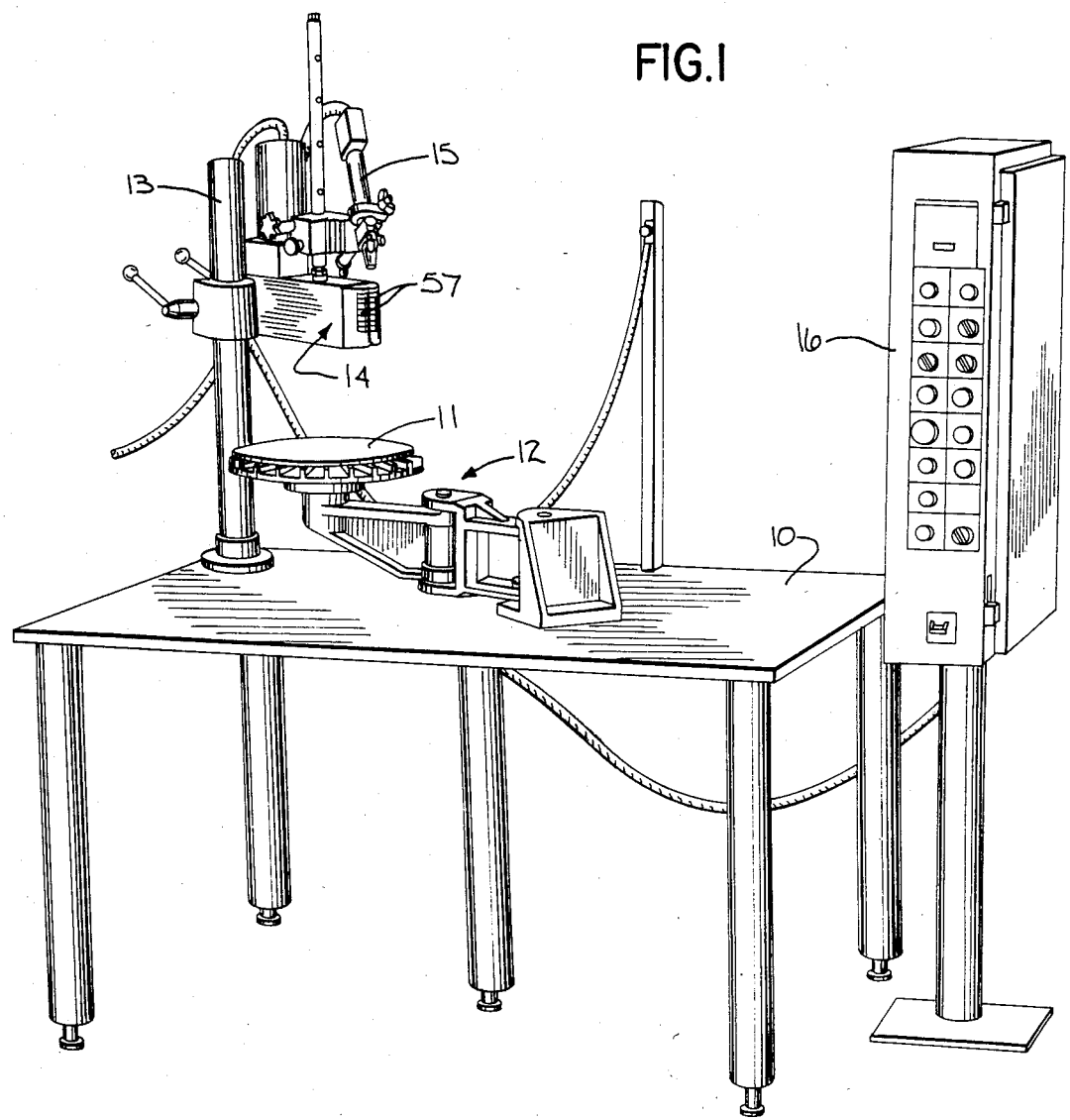
FIG. 1 is a view in perspective of an automatic welding positioning machine in accordance with the present invention.

Referring now to the drawings, and particularly to FIG. 1, the welding positioning machine includes a table 10 which mounts a support plate 11 mounted on the end of an arm assembly 12. A vertical standard 13 rises from one corner of the bench 10 and mounts a drive roller assembly 14 which in turn supports a welding gun 15. A control station 16 is disposed to one side of the bench 10.

Figure 2:
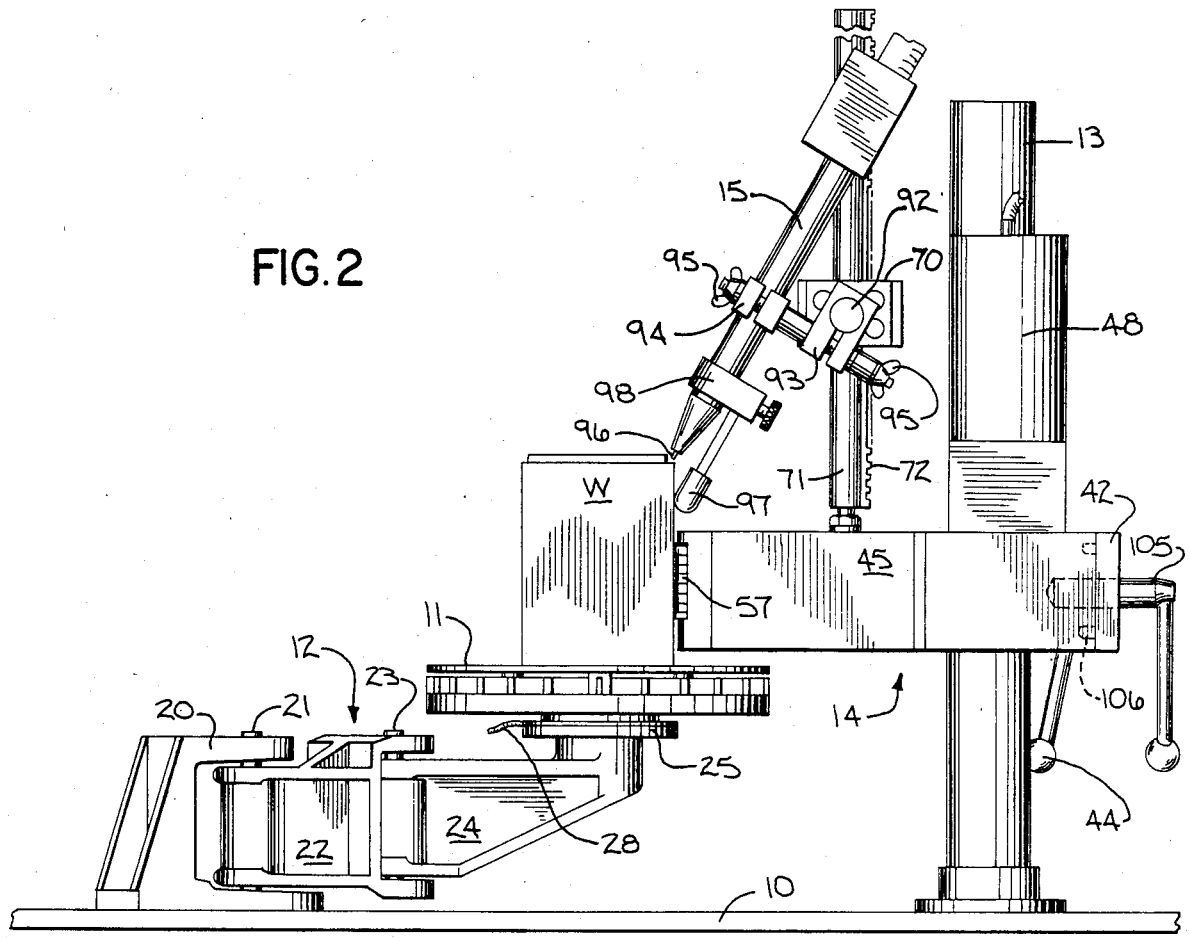
FIG. 2 is a rear view in elevation of the automatic welding machine.
Figure 6:
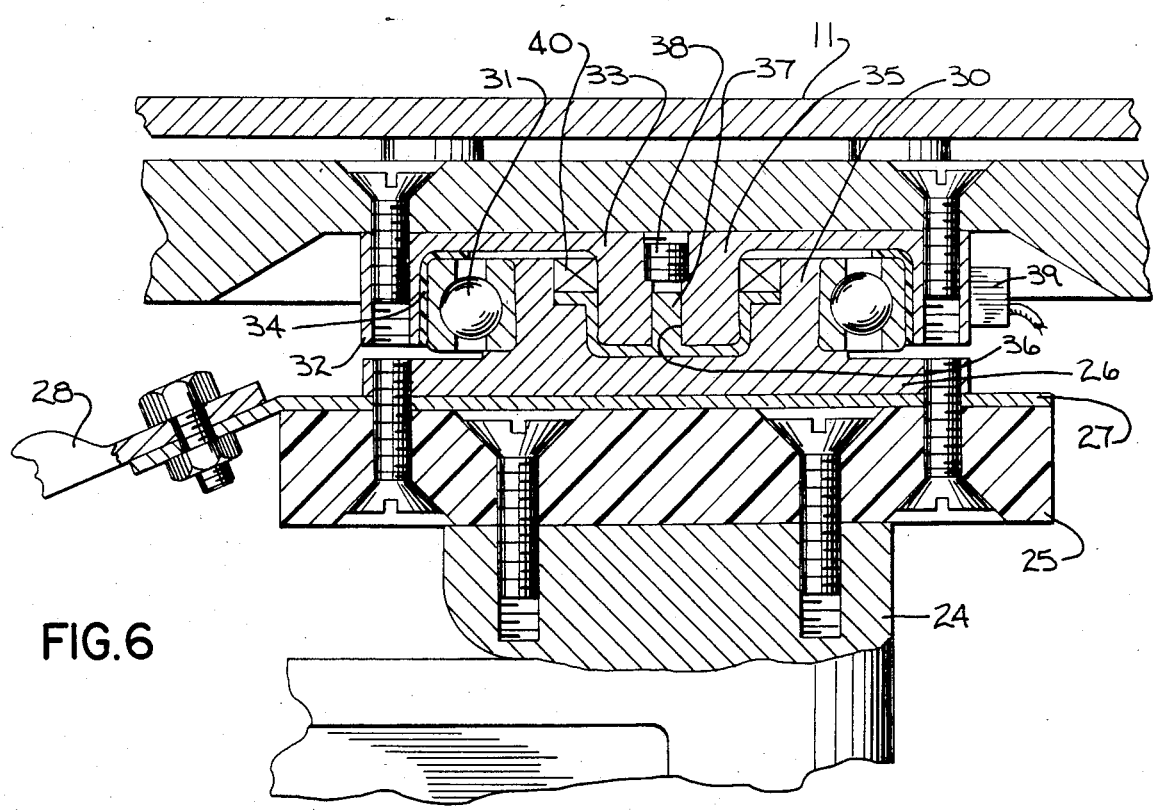
FIG. 6 is a view in vertical section through the center of the support plate.
Figure 3:
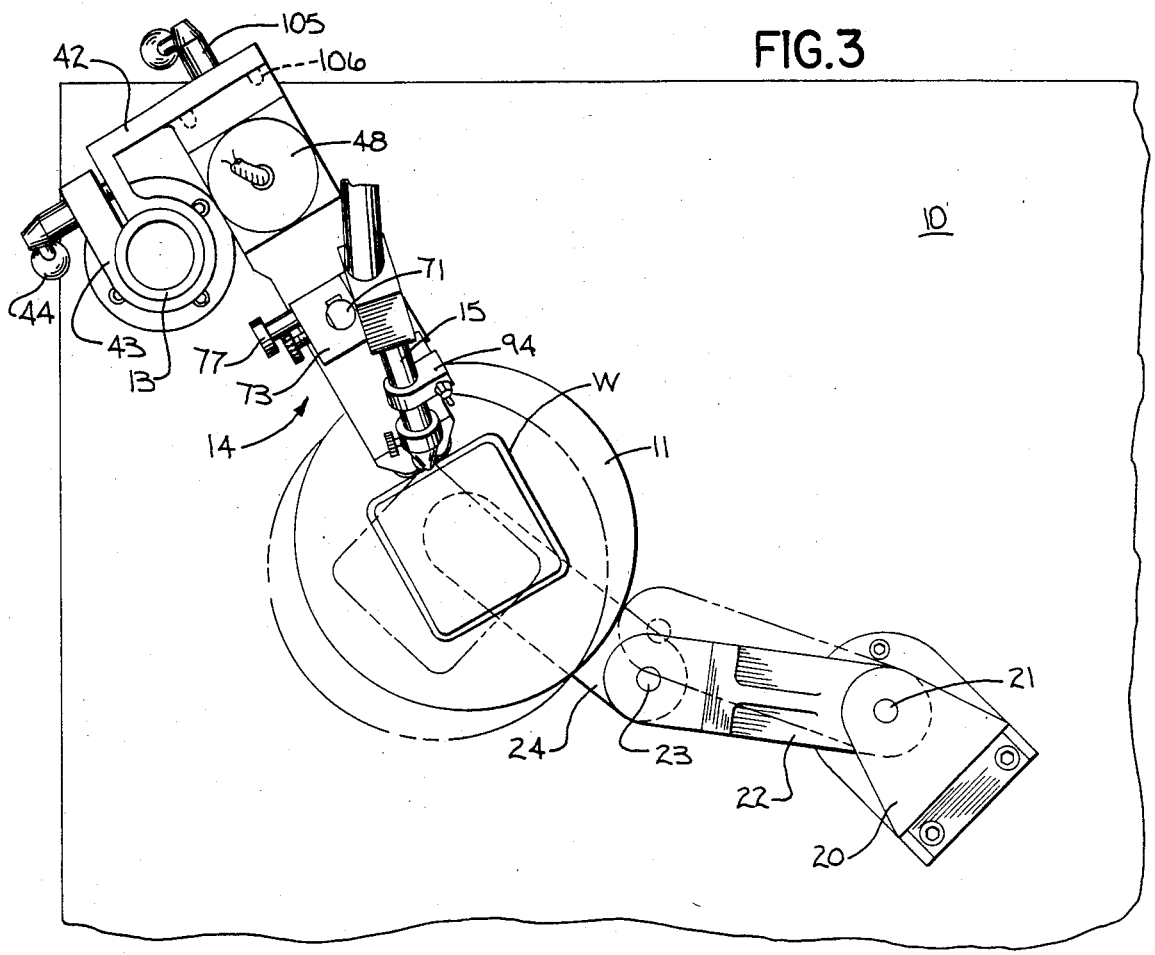
FIG. 3 is a partial plan view of the automatic welding machine with an alternate position for the support table and workpiece shown in phantom lines.

The arm assembly 12 is a double articulated arm arrangement. As best seen in FIGS. 2 and 3, the arm assembly 12 includes a main support 20 which is secured to the top of the bench 10 and which mounts a first vertical pivot shaft 21. One end of a first arm 22 has a bore which is received on the first pivot 21 and the opposite end of the first arm 22 is formed as a clevis which mounts a second pivot shaft 23. The pivot shaft 23 is received in a bore on one end of a second arm 24. The free end of the second arm 24 mounts a horizontal platform 25 which is formed of a non-conductive material, such as a phenolic resin. As seen in FIG. 6, a lower grounding hub 26 is formed from a conductive material and attached to the non-conductive platform 25. Sandwiched between the non-conductive platform 25 and the lower hub 26 is a conductive layer 27 which is connected to a grounding strap 28. The lower hub 26 has an upstanding circular cylindrical flange 30 which mounts the inner race of a ball bearing 31. The outer race of the ball bearing 31 is mounted on the inner diameter of a depending rim 32 of an upper grounding hub 33 with a sheet of insulating material 34 sandwiched therebetween. The upper hub 33 has a central depending core portion 35 provided with a through bore 36. The central core 35 is received within and spaced from the interior diameter of the flange 30 of the lower hub 26. A pool of mercury 37 is disposed between the upper and lower hubs 33 and 26, respectively. A plug 38 closes off the central bore 36 through which the mercury is inserted into the assembly. A seal 40 prevents migration of the mercury to or through the bearing 31. The support plate 11 is attached to the upper hub 33 to complete the assembly.

As will be appreciated, a grounded connection is established from the support plate 11 through the upper hub 33, the pool of mercury 37, the lower hub 26, the conductive layer 27 to the ground strap 28. The grounded connection is not made through the ball bearing 31. Instead, the insulating layer 34 prevents the flow of current across the races of the bearing 31. A temperature sensor 39 is connected to the upper hub 33 to function as an overload device to halt current to the welder when the current becomes excessive and results in heating of the support plate 11 beyond a predetermined level.

It will be appreciated that the support plate 11 is freely movable in a horizontal plane by reason of the two articulated arms 22 and 24. The support plate 11 can support a workpiece W on its upper surface.

The roller assembly 14 includes a rear support bracket 42 which has a clamp portion 43 that encircles the standard 13. The clamp 43 can be loosened or tightened by a lever handle 44 in a conventional manner to allow for the adjustment of the position of the roller assembly 14 both vertically and angularly around the axis of the standard 13.

Figure 5:
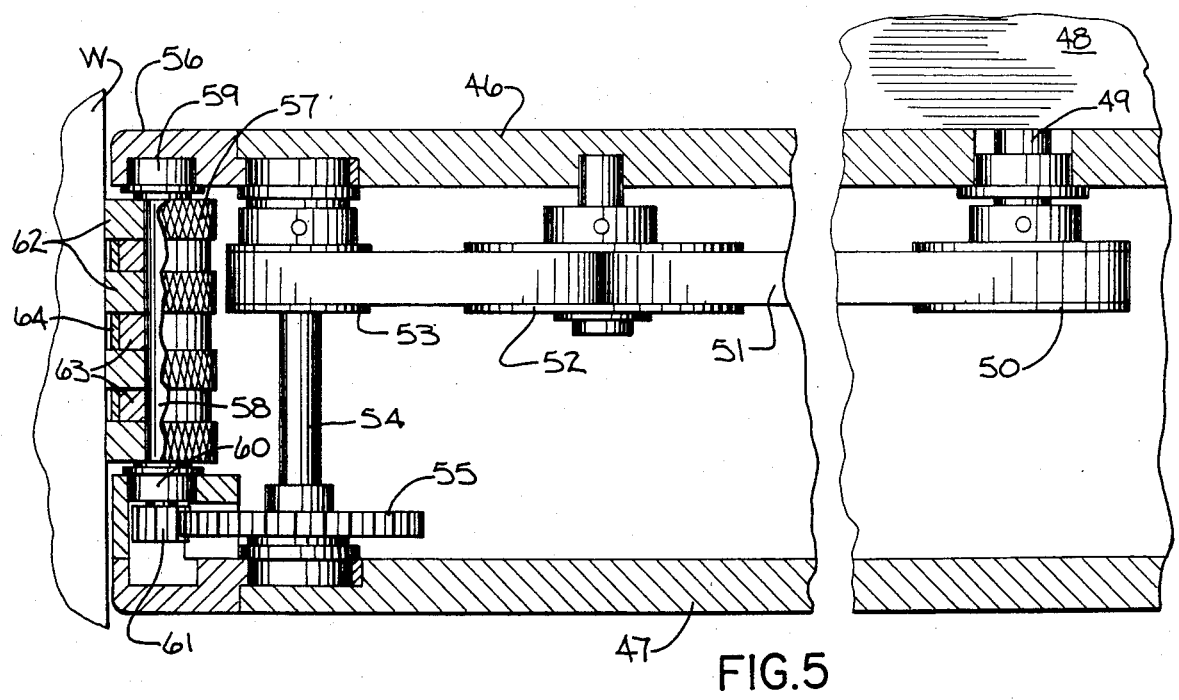
FIG. 5 is a view in vertical cross section through the roller support and drive of FIG. 4.

A roller housing 45 extends forwardly from the bracket 42. The roller housing 45 includes top and bottom walls 46 and 47, respectively, (see FIG. 5). An electric motor 48 is attached to the top wall 46 with its motor shaft 49 extending through an opening in the top wall 46.

A toothed pulley 50 is mounted on the motor shaft 49. A toothed drive belt 51 extends about the pulley 50, an intermediate idler pulley 52, and a driven pulley 53. The driven pulley 53 is mounted on a driven shaft 54, which also mounts a spur gear 55. The driven shaft 54, and the motor shaft 49 are mounted in suitable bearings in the upper and lower walls 46 and 47. An end cap 56 is mounted at the forward end of the roller assembly 14. A pair of drive rollers 57 are mounted in the end cap 56 with their axes parallel to each other. Each drive roller 57 includes a central shaft 58 journaled in an upper bearing 59 and a lower bearing 60 held in the end cap 56. The roller shaft 58 extends through the lower bearing 60 to mount a pinion 61 which meshes with the spur gear 55. The drive roller 57 also includes alternating disc-like pole pieces 62 and permanent magnets 63. An aluminum jacket 64 surrounds each permanent magnets 63. The pole pieces 62 have knurled surfaces on their periphery which project beyond the nose of the end cap 56 and the surfaces of the two drive rollers 57 are nearly in contact. As will be appreciated, rotation of the drive motor 48 will cause the drive rollers 57 to be rotated in a common direction.

Figure 7:
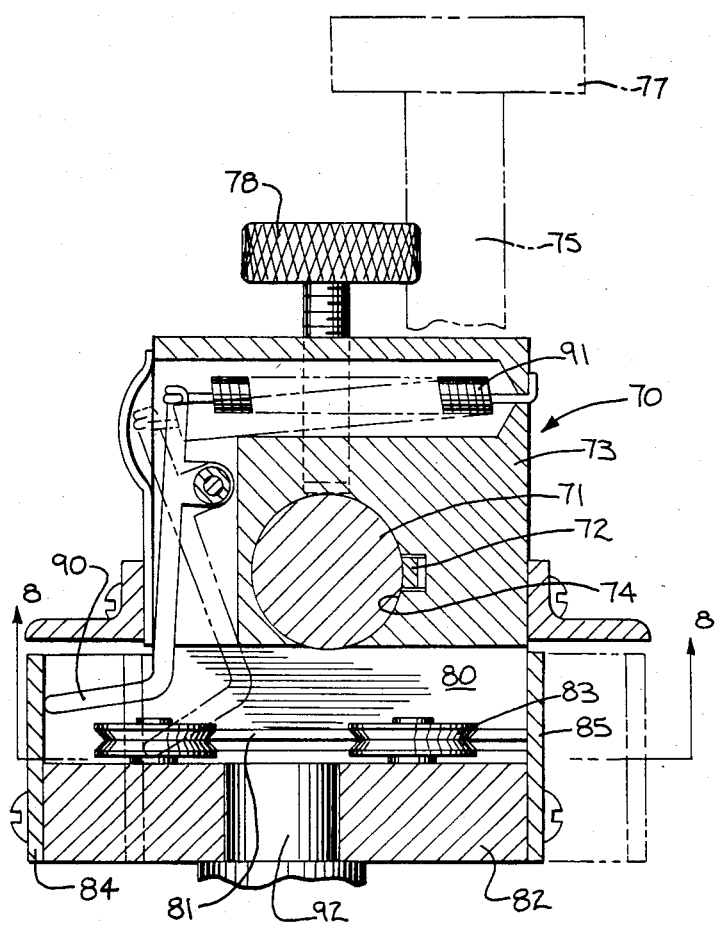
FIG. 7 is a view in horizontal section through the mount for the welding gun.
Figure 8:
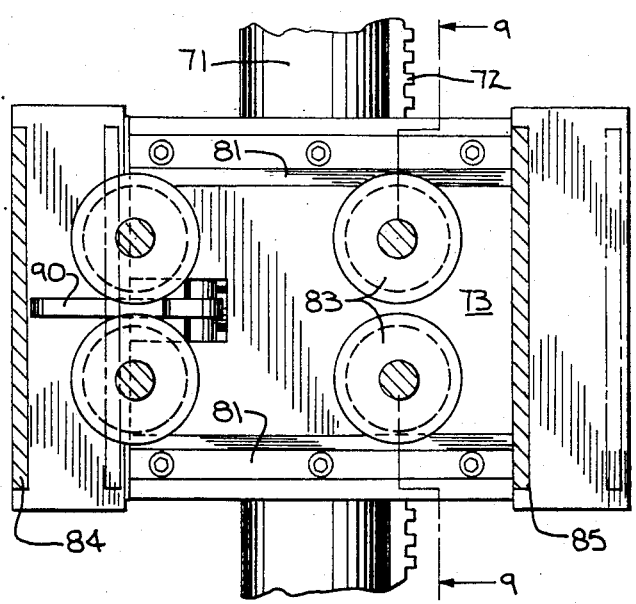
FIG. 8 is a view in vertical section taken in the plane of the line 8—8 of FIG. 7.
Figure 9:
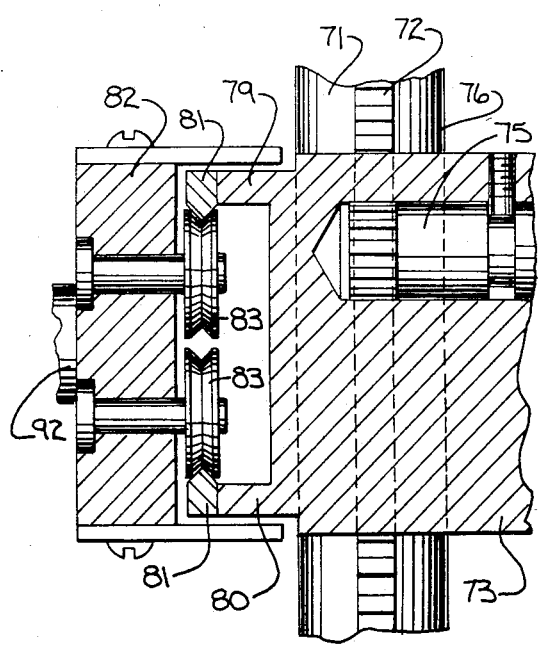
FIG. 9 is a view in vertical section taken in the plane of the line 9—9 of FIG. 8.

The welding gun 15 is supported in a gun carriage assembly 70 which is supported on an upright column 71 which extends from the top wall 46 of the roller housing 45 in a direction parallel to the axes of the drive rollers 57. The column 71 has a rack 72 along one side. Referring to FIGS. 7-9, the gun carriage assembly 70 includes a block 73 having a bore 74 which surrounds the column 71 and with a linear recess to accommodate the rack 72. A shaft 75, having a complimentary pinion 76 engaging the rack 72, is journaled in and held against removal in the block 73. The shaft 75 extends out of the block 73 and mounts a large knob 77 which can be rotated to adjust the vertical position of the carriage assembly 70 on the column 71. A thumb screw 78 extends through the block 73 and bears against the column 71 to hold the carriage assembly 70 in the position to which it has been adjusted.

One face of the block 73 is provided with top and bottom extending flanges 79 and 80, respectively, which mount upper and lower rails 81. A carriage 82 has upper and lower pairs of notched wheels 83 which engage the upper and lower rails 81 so that the carriage 82 may roll to and fro with respect to the column 71 on which the block 73 is mounted. The limit of motion of the carriage 82 on the block 73 is defined by the width of the flanges 79 and 80 which are engaged by front and rear plates 84 and 85, respectively of the carriage 82.

The carriage 82 is urged to a position towards the drive rollers 57 by a spring assembly which includes a bell crank lever 90 having its long, free end bearing against the front end plate 84 of the carriage 82 and having its short end connected to a torsion spring 91 which is anchored in the block 73.

The carriage 82 mounts a stub shaft 92 which receives a clevis type clamp 93. A single threaded shaft extends through both the clamp 93 and a similar clevis clamp 94, and has wing nuts 95 at each end. The second clamp 94 receives the barrel of the welding gun 15.

In a conventional manner, a wire electrode 96 extends through the barrel of the welding gun 15 from a coil of wire (not shown) and is automatically played out from the coil at a speed equal to wire being consumed.

A probe 97 is mounted in a probe holder 98 which surrounds the barrel of the welding gun. The position of the probe holder 98 on the gun 15 and the position of the probe 97 in the holder 98 are both adjustable. The probe 97 senses surface irregularities, or part-to-part variations and transmits such variations to the welding gun 15 which then follows the time contour.

Figure 4:
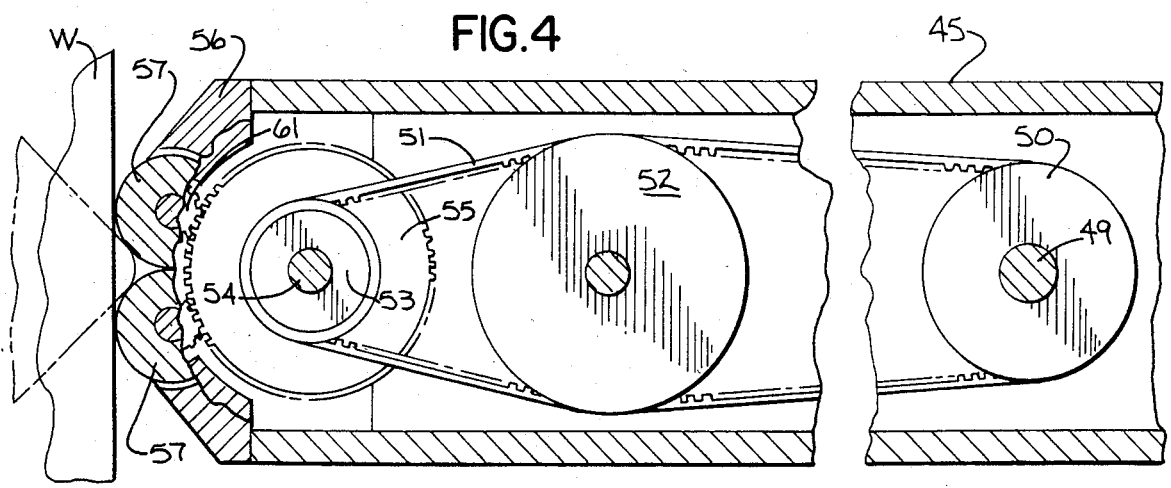
FIG. 4 is a view in horizontal cross section through the support and drive for the rollers.

The operation of the welding positioning machine will be explained in relation to a workpiece which, as shown in FIGS. 1-9, has a cylindrical body with a generally square cross section and a flat end plate is to be welded to the open top of the body of the workpiece. The workpiece W rests on the support plate 11. Typically, there is no need for clamping of the workpiece W to the table since the only function of the support plate is to support the weight of the workpiece. The positioning of the workpiece is the function of the drive roller 57. The roller assembly 14 is positioned to a desired height and a desired angular position on the standard 13 and is brought to bear against the workpiece W. The permanent magnet assembly in the drive rollers 57 will grab onto a workpiece. The tip of the welding gun 15 is then positioned relative to the workpiece W. Such positioning is accomplished by manipulation of the clamps 93 and 94 and by vertical adjustment of the gun holder on the column 71. The tip of the gun 15 should be positioned in a plane which is midway between the axes of the rollers 57. When the tip of the welding gun 15 has been placed in its proper position relative to the workpiece, the probe 97 is positioned to contact the surface of the workpiece and is clamped in that position. The motor 48 is then energized to drive the rollers 57. As the rollers 57 are rotated, the workpiece W is moved and turned. The closely spaced rollers 57 are capable of following the contours of the sides of the workpiece. They can accommodate corners or other irregular shapes on the surfaces of the workpiece, as shown in FIG. 4.

As the workpiece is turned by the drive rollers 57, the welding gun 15 will be moved inwardly and outwardly under the urgings of the probe 97 with the carriage 82 floating on the mounting block 73. Thus, when a corner of a workpiece is confronted by the rollers 57, the surface of the workpiece will move inwardly to a slight degree between the closely spaced rollers 57 (see FIG. 4). The probe 97 which is riding this same surface will similarly be moved inwardly and will move the welding gun 15 inwardly. Thus, the wire electrode 96 will always closely follow the perimeter of the workpiece even if it has a noncircular cross-section and even if ripples, dents or other such irregularities exist in the part to be welded. The attitude of the tip of the welding gun 15 relative to the workpiece surface will not change since it moves in a direction normal to the axes of the rollers 57 and therefor normal to the surface of the workpiece.

Figure 10:
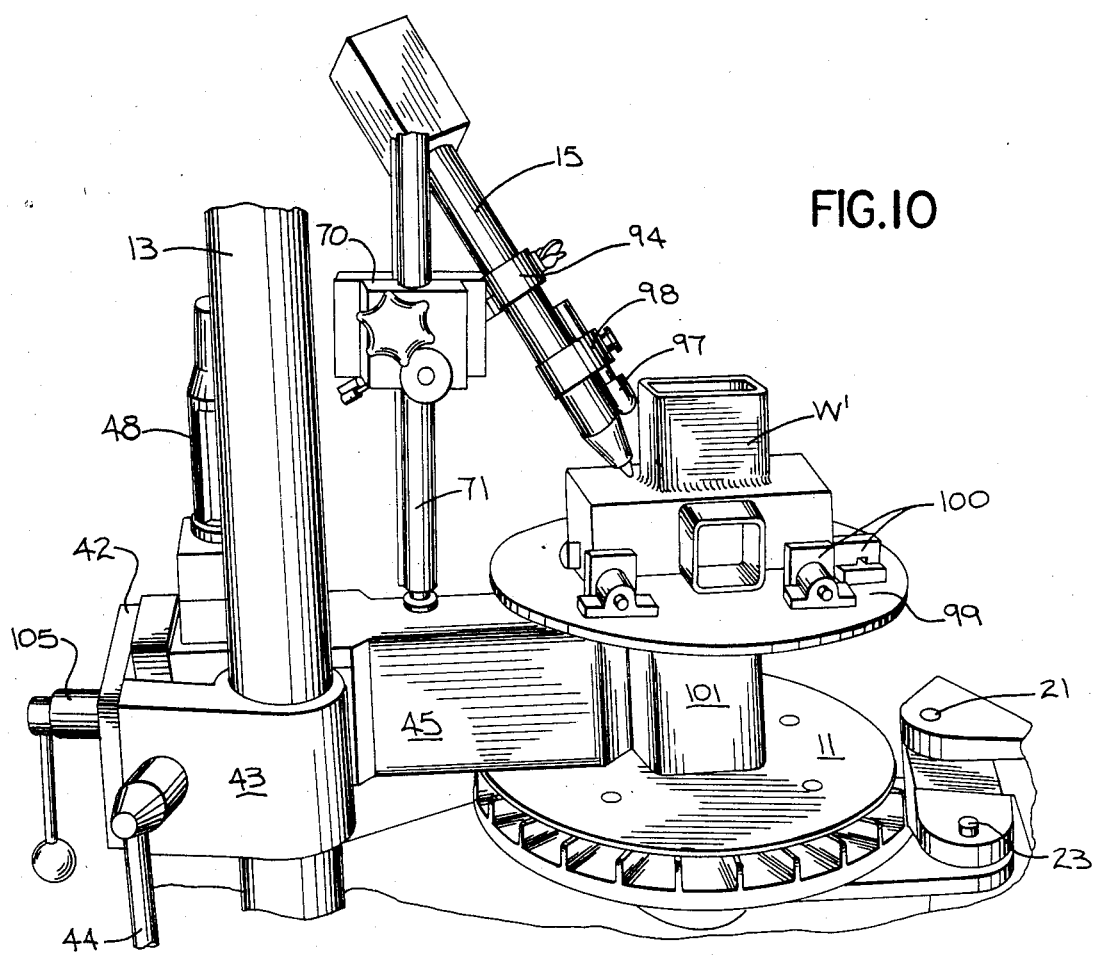
FIG. 10 is a partial view in perspective illustrating the welding of a workpiece using a special fixture.

Since it is necessary for the rollers 57 to contact the surface of the workpiece, there are some parts which by reason of their size may require special fixturing. The special fixture includes a template which is identical in cross section to the shape of the seam to be welded. The template is engaged by the drive rollers 57 and the movement of the pattern by the rollers controls the turning of the piece part. An example of such a fixture is shown in FIG. 10. A workpiece W' is mounted on a plate 99 by releasable clamps 100. The workpiece W' includes a square cylindrical section which is to be welded on top of a horizontal box portion. The depth of the section is insufficient to accommodate the length of the rollers 57. A template column 101 rests on the support plate 11. The cross-section of the template 101 is identical to the shape of the seam which must be welded on the workpiece W'. Rotation of the template 101 by the drive rollers 57 will rotate the plate 99 and workpiece W' and cause the workpiece W' to be turned and moved through the proper path so that the gun 15 will produce the welded seam as required. Such a template may also be used when the workpiece is not magnetic.

Figure 11:
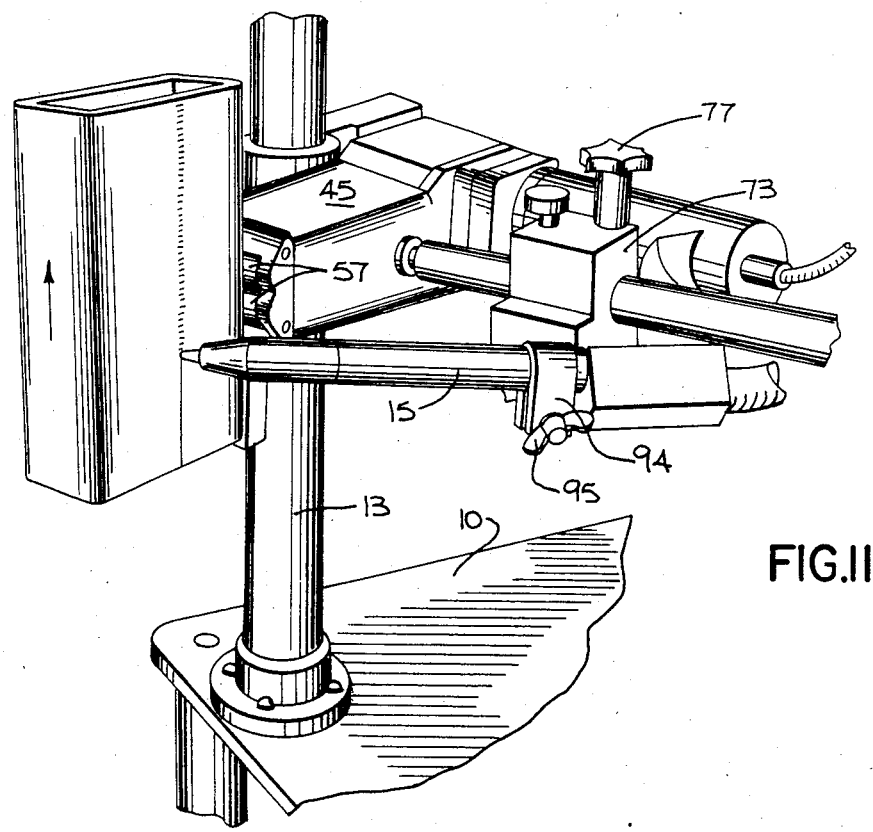
FIG. 11 is a partial view in perspective illustrating an alternate attitude on which the automatic welding machine can be used.

Referring to FIG. 11, the roller assembly and welding gun are shown in a different orientation to produce a linear weld rather than a weld along a periphery of a workpiece. To place the roller assembly and welding gun in the position shown in FIG. 11, a threaded shaft 105 is screwed outwardly so as to release the connection between the bracket 42 and the rear of the roller housing 45. The threaded shaft extends through the rear bracket 42 and is received in the rear of the roller housing 45. A series of four guide pins 106 project from the rear bracket 42 and are received in recesses formed near the four corners of the rear face of the roller housing 45. Thus, the roller housing 45 can be positioned in any one of four positions relative to the bracket 42.

In the position shown in FIG. 11, the workpiece is supported solely by the drive rollers 57 and will be moved in a straight line as the rollers are driven. The welding gun 15 will produce a straight weld along the seam. A special grounding connection to the workpiece will, of course, be necessary. In the arrangement shown in FIG. 11, the probe 97 is not needed since the position of the surface of the workpiece will not vary relative to the tip of the gun 15. When the probe is not needed, the gun 15 is adjusted initially when it is in the position to which it is urged by the spring assembly. The spring assembly in the gun holder 70 will hold the gun 15 in that extended position The invention has been illustrated and described in relation to an arc welding machine. The positioning apparatus is, however, usable with other welding processes and with processes other than welding. For example, instead of positioning a workpiece relative to a welding gun, the tool could be a torch cutter, a laser cutter, a glue gun, or a single paint cutting tool.

We claim:
1. A welding machine comprising:
a workpiece support table freely movable in a horizontal plane;
an upright standard adjacent said support table;
a pair of closely spaced rollers mounted in a roller housing mounted on said standard by a releasable clamp mechanism which slides about the standard so that the roller housing may be positioned vertically and angularly relative to the axis of the standard, said rollers having their axes normal to the plane of said support table, said rollers including permanent magnets which will hold the perimeter surface of a workpiece against the rollers;
a motor connected to rotate said rollers in a common direction and to thereby turn a workpiece held against said rollers;

a carriage assembly including a welding gun, said carrier assembly being supported on a column extending from said roller housing in a direction parallel to the axes of said rollers, said carriage assembly and welding gun being movable along said column in a direction normal to the axes of said rollers; and a probe mounted with said carriage assembly and adapted to engage the perimeter of the workpiece to position the welding gun relative to the surface of the workpiece.

2. A welding machine in accordance with claim 1 wherein said carriage assembly includes a block surrounding said column and having a pair of spaced rails along one side which extend in a direction normal to the axis of the column, a carriage for mounting the gun and having spaced wheels riding on said rails, and biasing means for urging the carriage in a direction toward the rollers.

3. A welding machine in accordance with claim 2 wherein said column has a rack extending along one side and a shaft is journaled in said block and has a pinion portion engaging said rack so that the position of said holder can be adjusted along the length of said column.

4. A welding machine comprising:
a grounded workpiece support table freely movable in a horizontal plane, said support including a non-conductive lower platform with a grounded conductive layer on its upper surface, a lower hub mounted on top of said conductive layer, a ball bearing having one of its races mounted on the lower hub, an upper hub mounting an upper platform and mounted on the other race of the bearing with a non-conductive layer disposed therebetween, and a pool of mercury disposed between said hubs;

an upright standard adjacent said support table;

a pair of closely spaced rollers mounted on and extending outwardly from said standard, said rollers having their axes normal to the plane of said support table, said rollers including permanent magnets which will hold the perimeter surface of a workpiece against the rollers;

a motor connected to rotate said rollers in a common direction and to thereby turn a workpiece held against said rollers;

a carriage assembly including a welding gun mounted on said standard for movement in a direction normal to the axes of said rollers, said welding gun mounting a wire electrode; and a probe mounted with said carriage assembly and adapted to engage the perimeter of the workpiece to position the welding gun relative to the surface of the workpiece.

5. A welding machine in accordance with claim 4 wherein said lower platform is mounted on a double articulated arm assembly.

* * * * *